(12) United States Patent
Rubens et al.

(10) Patent No.: US 9,855,632 B2
(45) Date of Patent: Jan. 2, 2018

(54) DUST EXTRACTION SYSTEM FOR A POWER TOOL

(75) Inventors: Jeremy Rubens, Palatine, IL (US); Jaime Moreno, Arlington Height, IL (US); Chastity Martinez, Schiller Park, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1495 days.

(21) Appl. No.: 13/431,312

(22) Filed: Mar. 27, 2012

(65) Prior Publication Data

US 2013/0255983 A1    Oct. 3, 2013

(51) Int. Cl.
  *B23Q 11/00*    (2006.01)
(52) U.S. Cl.
  CPC .................................. *B23Q 11/0046* (2013.01)
(58) Field of Classification Search
  CPC .................................... B08B 15/04; A47L 9/00
  USPC ......... 173/75, 198; 409/182; 15/339; 30/124
  See application file for complete search history.

(56) References Cited

U.S. PATENT DOCUMENTS

| | | | |
|---|---|---|---|
| 3,904,301 A * | 9/1975 | Schroeder ..................... 403/259 |
| 5,772,367 A | 6/1998 | Daniel | |
| 6,079,078 A * | 6/2000 | Byington ........................ 15/339 |
| 6,159,084 A * | 12/2000 | Tiede ............................ 451/357 |
| 6,854,937 B1 * | 2/2005 | Weiss ............................ 409/137 |
| 2002/0090274 A1 | 7/2002 | Berry et al. | |
| 2004/0224621 A1 | 11/2004 | Fraser et al. | |
| 2004/0248507 A1 | 12/2004 | Brazell et al. | |
| 2006/0276116 A1 * | 12/2006 | Reich et al. ................... 451/453 |
| 2007/0292222 A1 * | 12/2007 | Colon ........................... 408/1 R |
| 2010/0008775 A1 * | 1/2010 | Vedsted et al. ............... 415/228 |
| 2010/0170538 A1 * | 7/2010 | Baker et al. ..................... 134/18 |
| 2010/0209207 A1 | 8/2010 | Ceroll et al. | |

FOREIGN PATENT DOCUMENTS

| | | |
|---|---|---|
| DE | 102007030858 A1 | 2/2008 |
| SU | 1579720 A1 | 7/1990 |

OTHER PUBLICATIONS

International Search Report and Written Opinion in corresponding PCT application (i.e., PCT/US2013/034123), dated Mar. 7, 2013 (10 pages).

* cited by examiner

*Primary Examiner* — Nathaniel Chukwurah
(74) *Attorney, Agent, or Firm* — Maginot. Moore & Beck LLP

(57) ABSTRACT

A dust extraction system for a power tool having a output shaft, a collet configured for engaging a tool bit and a collet nut engageable to the output shaft, comprises a base configured for mounting on the power tool, the base defining a cavity having an opening for passage of the output shaft therethrough and a discharge chute in communication with the cavity. The system further includes an impeller sized and configured to be rotatably received within the cavity, including a hub and a plurality of vanes emanating from the hub configured to draw dust from the workpiece into the cavity and to direct the dust through the discharge chute. A collet nut is integrated into the hub of the impeller so that the impeller can be directly mounted to the output shaft of the power tool while clamping the collet onto the tool bit.

20 Claims, 6 Drawing Sheets

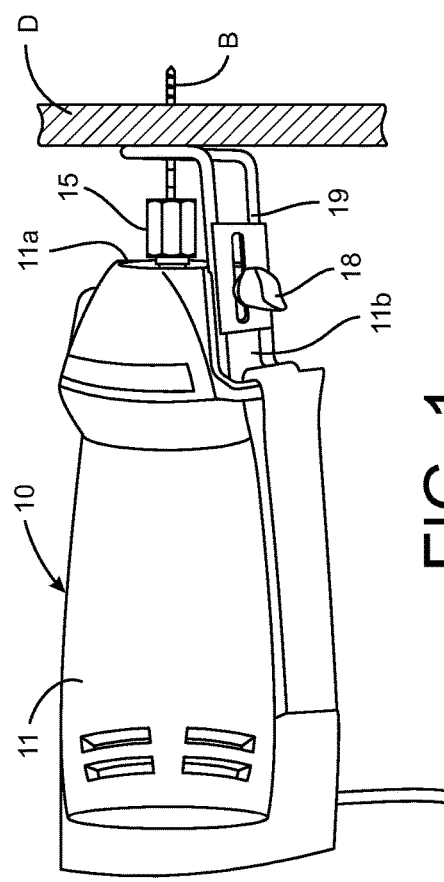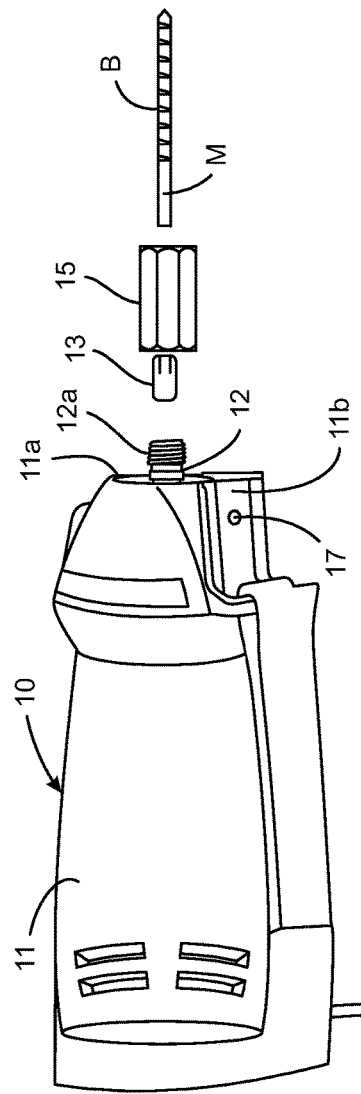
FIG. 1 (Prior Art)
FIG. 2 (Prior Art)

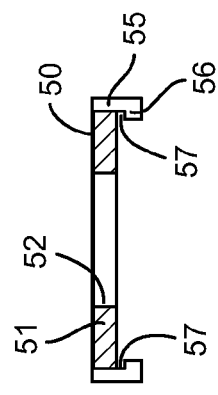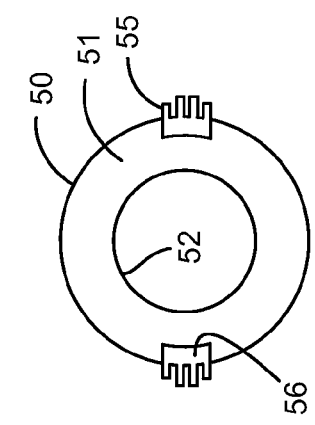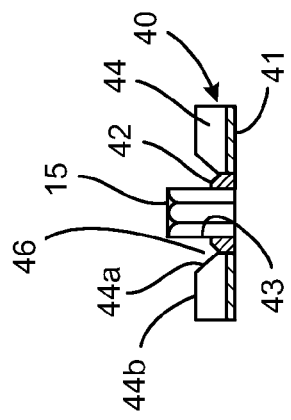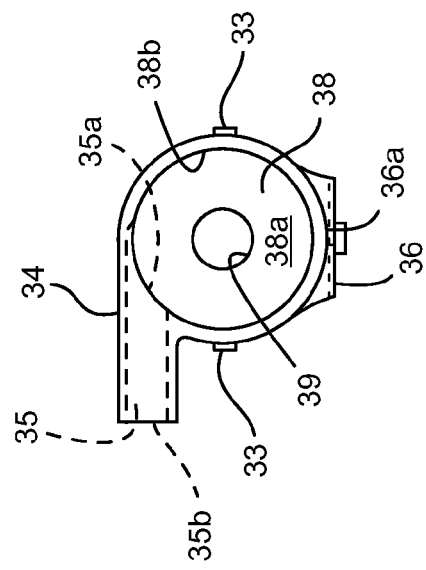

DUST EXTRACTION SYSTEM FOR A POWER TOOL

BACKGROUND

The present disclosure relates generally to the field of power tools. More specifically, the present disclosure relates to power tools that include systems for collecting or otherwise removing debris (e.g., particles, dust, sawdust, chips, etc.) generated during operation of the power tools.

Power tools generally include a housing and a motor contained within or at least partially enclosed by the housing. The motor is configured to move a tool bit or other accessory at high speeds to penetrate materials such as wood, drywall, tile, stone, etc. For example, a rotary cutting tool 10 such as that shown in FIGS. 1-2 includes a hand-held motor housing 11 with the motor output shaft 12 projecting from the working end 11a of the tool. A collet 13 supports a cutting bit B and is locked to the output shaft by a collet nut 15 that is internally threaded to engage the external threads 12a of the output shaft. The collet 13 and collet nut 15 cooperate so that the collet clamps onto the mounting end M of the bit to fix the bit to the output shaft for rotation with the shaft. The bit B includes a sharp cutting edge wrapped in a helix around the longitudinal axis of the bit. In this example, the rotary cutting tool 10 forms cuts in a workpiece, such as a drywall panel D (FIG. 1) by moving the tool in a direction that is substantially perpendicular to the axis of rotation of the tool bit. The tool 10 may be provided with a depth guide attachment 19 that is adjustably mounted to a surface 11b of the housing 11 by a thumb screw 18 threaded into a mounting bore 17 defined in the surface.

Hand-held power tools are known to generate a substantial amount of dust while cutting. Such dust may interfere with further cutting by accumulating on the surface of the workpiece, on the tool bit, and/or within the cutting tool itself. Such dust may also become airborne and be dispersed throughout the working environment. This may be particularly undesirable if the hand-held power tool is being used in a "clean" environment, such as within a finished room (e.g., decorated, furnished, carpeted, etc.) since additional cleanup may be necessary.

Some power tools employ vacuum systems connected to the tool to remove cutting debris. Such vacuum systems typically make use of an adapter that is connected a vacuum hose of an external or standalone vacuum system (e.g., a shop vacuum, etc.). Thus, an adapter of this type requires the user to have access to a standalone vacuum system at the work site. Further, requiring a hand-held power tool to be coupled to a standalone vacuum system often makes use of the hand-held power tool more cumbersome. For example, the vacuum conduit coupling the adapter to the standalone vacuum system may interfere with the mobility or range of use of the tool. Further, the vacuum conduit may disrupt the balance or feel of the tool for a user.

Some power tools employ vacuum systems which are integrally formed with the power tool. Such vacuum systems increase the overall size and weight of the power tools. Moreover, the integral vacuum system is part of the tool even when debris removal is not required.

Thus, there is a need for a dust removal system for a hand-held power tool that is not required to be connected to a standalone vacuum system. There is also a need for a power tool having a detachable dust removal system that may be securely coupled to the power tool in a relatively simple and efficient manner. There a further need for a dust removal system that can be driven by the output shaft of the power tool. It would be desirable to provide a power tool and/or a dust removal system that provides one or more of these or other advantageous features as may be apparent to those reviewing this disclosure.

SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A dust extraction system is provided for a power tool having a output shaft, a collet configured for engaging a tool bit and a collet nut engageable to the output shaft to clamp the tool bit to the output shaft. The system is operable to extract dust and debris generated by operation of the tool bit on a workpiece. The system comprises a base configured for mounting on the power tool, the base defining a cavity having an opening for passage of the output shaft therethrough and a discharge chute in communication with the cavity. The system further includes an impeller sized and configured to be rotatably received within the cavity, including a hub and a plurality of vanes emanating from the hub configured to draw the dust and debris from the workpiece into the cavity and further to direct the dust through the discharge chute.

In one aspect, the dust extraction system includes a collet nut integrated into the hub of the impeller so that the impeller can be directly mounted to the output shaft of the power tool while clamping the collet onto the tool bit. The collet nut may be embedded within the hub of the impeller, may be integrally formed in the hub, or may be removably engaged within a conforming bore defined in the hub. With the collet nut integrated into the hub, the impeller hub may be used to tighten collet nut onto the threaded portion of the output shaft to tighten the collet about the tool bit. Alternatively, a portion of the collet nut may be accessible for engagement by a separate tool to tighten the collet nut onto the output shaft.

The system may be provided with a baffle that is engaged to the base to enclose the cavity and the impeller within the cavity. The baffle defines an opening through which the tool bit extends and through which the dust and debris is drawn into the system. A receptacle may be mounted to the discharge chute to collect the dust and debris extracted by the impeller. The receptacle may include a filter permeable to airflow but generally impermeable to dust and debris. The receptacle may also be connected to the discharge chute by a flexible hose, while the receptacle is supported remote from the power tool.

The dust extraction system is mountable to or removable from the power tool as desired. The base may be configured to mount to existing accessory mounting features of the tool. The system may be configured to be mounted to the tool fully assembled or may be configured to be sequentially assembled on the power tool. In the latter case, the base may be configured to be mounted to the power tool with the cavity exposed at the working end of the tool. If a separate collet nut is provided, the nut is engaged within the hub of the impeller and the impeller/collet nut assembly may be threaded onto the output shaft of the tool motor to attach the collet and tool bit. The collet nut may be threaded onto the output shaft by manually rotating the impeller. The baffle may be mounted to the system base at any time. When it is desired to remove the dust extraction system, the impeller or collet nut may be rotated to unthread the nut from the output shaft and the base disengaged from the tool housing.

The dust extraction system can be easily and quickly mounted and removed from a hand-held power tool. The system has a minimal profile and weight so that it does not interfere with the maneuverability of the power tool or interfere with the user's ability to grasp the tool. Since the collet nut is integrated with the impeller the dust extraction system does not increase the overall length of the tool. The system may also be modified to incorporate other accessories, such as a depth guide.

The impeller of the system is driven directly by the motor of the power tool. Thus, no external device, such as a shop vac, is required to remove dust and debris from the work site.

DESCRIPTION OF THE FIGURES

These and other features, aspects, and advantages of this disclosure will become better understood when the following detailed description of certain exemplary embodiments is read with reference to the accompanying drawings in which like characters represent like arts throughout the drawings, wherein:

FIG. 1 is a side view of a hand-held power tool engaged to cut a workpiece.

FIG. 2 is a partially exploded view of the power tool of FIG. 1 showing the tool bit and mounting collet assembly.

FIG. 5 is a top view of the housing of the dust extraction system shown in FIG. 3.

FIG. 6a is a top view of the impeller of the dust extraction system shown in FIG. 3.

FIG. 6b is a side partial cross-sectional view of the impeller shown in FIG. 6a.

FIG. 7a is a top view of the baffle of the dust extraction system shown in FIG. 3.

FIG. 7b is a side partial cross-sectional view of the baffle shown in FIG. 6a.

DETAILED DESCRIPTION

Figure 3:
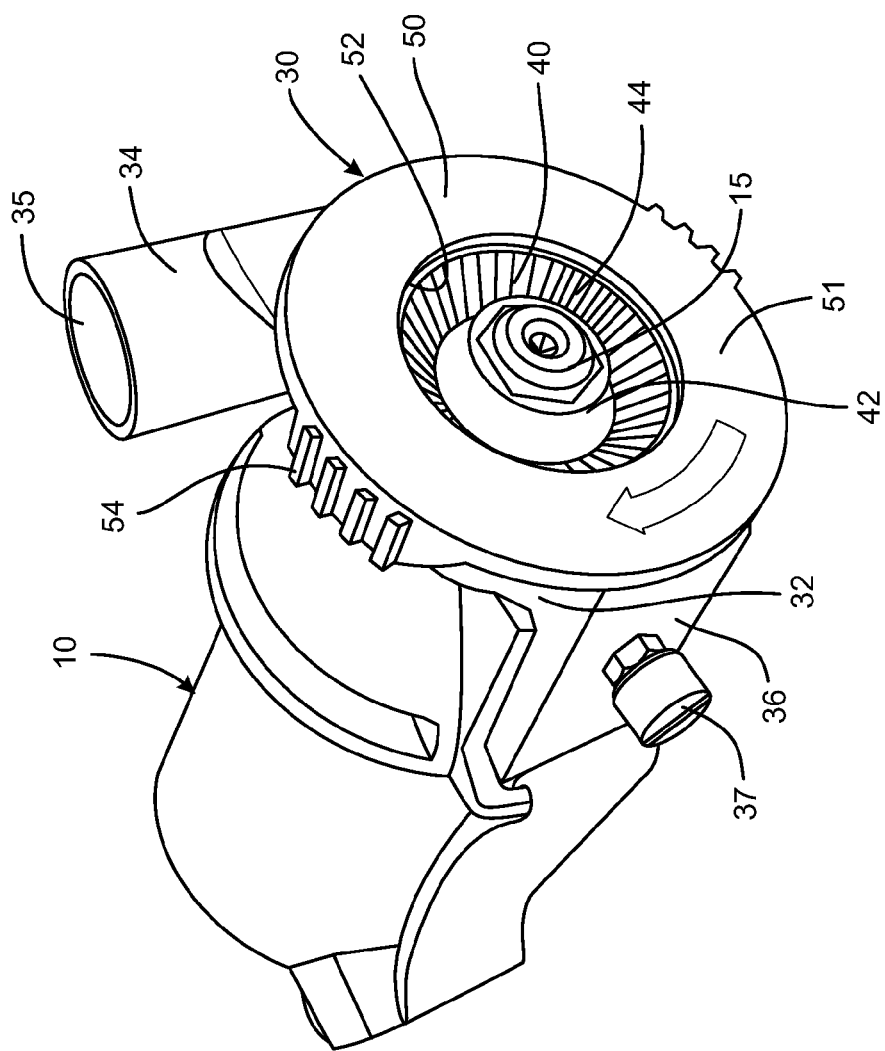
FIG. 3 is a front perspective view of the power tool of FIG. 1 with a dust extraction assembly according to the present disclosure mounted thereto.
Figure 4:
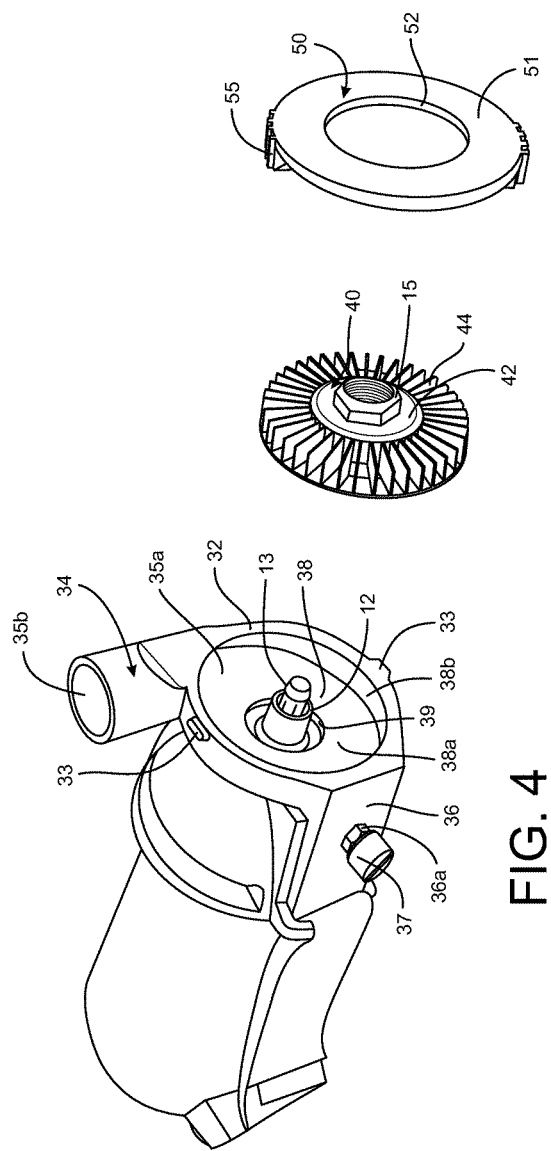
FIG. 4 is a partial exploded view of the dust extraction system shown in FIG. 3.

Referring to FIGS. 3-4, a dust extraction system 30 is shown engaged to the power tool 10. It is understood that the particular power tool is for illustrative purposes only and that the system 30 may be modified for engagement to a variety of power tools having an output shaft 12 and tool engaging collet arrangement. The dust extraction apparatus 30 includes a base 32 that is configured to seat onto the working end 11a (FIG. 1) of the tool housing 11. As shown in FIG. 4, the base may incorporate a mounting plate 36 that is configured to seat on the surface 11b of the tool housing. A mounting bolt 37 may extend through a collar 36a on the mounting plate and into the threaded bore 17 (FIG. 2) of the tool housing surface 11b. It is contemplated that the system base may be configured to accommodate other accessory mounting features for a particular power tool. Alternatively, the base 32 may include other features or elements to clamp onto the working end 11a of the tool housing 11.

As shown in FIGS. 4-5, the base includes a generally circumferential wall 38b defining a cavity 38 surrounding an opening 39 through which the tool output shaft 12 extends when the system is mounted on the tool as shown in the figures. The base and cavity are sized and configured so that the threaded portion 12a of the output shaft 12 is fully accessible to allow unencumbered attachment of the collet and tool bit. The base further includes a discharge chute 34 that defines a discharge passageway 35 therethrough. As shown in FIG. 5 the cavity 38 may be circular and the discharge chute 34 may be oriented generally tangential to the outer perimeter of the cavity. The passageway 35 intersects the cavity at an inlet 35a and exits the conduit at an opposite outlet 35b. The passageway 35 is sized to permit free passage of dust and debris direct therethrough by an impeller 40, described herein. In the illustrated embodiment the discharge chute is a generally cylindrical tubular structure projecting from the base 32. The length of the chute may be sufficient to be clear of the tool housing 11 but not so long as to interfere with the manual use of the tool. In one specific embodiment the chute 34 has a length of about two inches. However, it is contemplated that the chute may be more limited in length so that the outlet 35a is generally integral with the circumferential wall 38b of the base.

Details of the impeller 40 are shown in FIGS. 4, 6a, 6b. The impeller or fan is sized to fit fully within the cavity 38. The bottom face 41 of the impeller is configured to conform to the bottom surface 38a of the cavity 38. The impeller 40 has a circular profile and is sized for a close running fit within the outer wall 38b of the cavity. The cavity and impeller are preferably sized to minimize the gap or clearance between the cavity and impeller to minimize the chance of dust and/or debris collecting in that gap. The impeller 40 includes a plurality of impeller vanes 44 emanating radially from a central hub 42. In one embodiment, the vanes may be include an inwardly angled portion 44a that is angled toward the central hub 42 and a main portion 44b that has a generally uniform height. This configuration creates a dust collection region 46 around the hub 42, which is aligned with the tool output shaft 12, and ultimately with the tool bit B. Dust and debris created by operation of the bit B on the workpiece D may initially collect within the collection region 46 to be dispersed radially outward by the impeller vanes 44. The impeller vanes 44 are shown as being radially straight and generally trapezoidal in FIG. 6b; however, other vane configurations are contemplated provided they generate a negative pressure at the dust collection region 46 and are capable of propelling the debris radially outward toward the outer wall 38b, and ultimately out through the discharge chute 34. For instance, the vanes may be curved, may be fully tapered from the inner radius of the vane to the outer radius, or may be rectangular rather than trapezoidal in shape.

In one feature of the dust extraction system, the hub 42 of the impeller defines a bore 43 that is configured for firm engagement with the collet nut 15, as shown in FIGS. 4 and 6b. Thus, the bore may be complementary in shape to the collet nut—for instance, a hex shape to correspond to the hex form of the nut. The bore 43 may be configured for a press-fit engagement with the nut 15 so that the impeller 40 cannot be readily separated from the nut 15 during rotation of the impeller by the tool motor. In certain embodiments, the hub 42 itself may be configured as a collet nut, such as by sizing the bore 43 and providing the bore with internal threads for threaded engagement with the threaded end 12a of the output shaft 12. In this instance the impeller 40 and hub 42 replaces the collet nut 15. The hub 42 is formed of a material that is sufficiently rigid to withstand high speed rotation by the tool motor. In the instance in which the collet nut is embedded within the hub bore, the hub material is sufficiently resiliently deformable to permit a solid press-fit engagement that can withstand high speed rotation without slippage.

It can be appreciated that the dust extraction system as thus far described is easily mounted to an existing tool, such as the tool 10 of FIG. 2. In particular, the base 32 can be mounted to the working end 11*a* of the tool, such as by engaging the mounting plate 36 to the surface 11*b* of the tool housing 11 and fastening the base thereto by tightening the mounting bolt 37 to the accessory mount 17. The base is oriented with the output shaft 12 projecting through the opening 39 in the base. As shown in FIG. 4, the collet 13 may be disposed within the output shaft in a conventional manner. The tool bit (not shown in FIG. 4) may also be situated within the collet in a conventional manner. With the base 32 in position, the impeller 40 may be introduced into the cavity 38. More particularly, the impeller 40 may be first prepared by engaging the collet nut 15 within the bore 43 (unless the hub 42 includes an integral collet nut feature). The collet nut can then be threaded onto the threaded end 12*a* of the output shaft 12 just as the collet nut would be threaded in normal use of the tool. The body of the impeller 40 itself can be manually rotated to thread the collet nut onto the output shaft. In this instance, the hub 42 may be sized so that the collet nut is completely embedded within the bore 43. Alternatively, the collet nut 15 may project partially from the hub 42 (as illustrated in FIG. 6*b*) so that the nut may be engaged manually or by a separate tool to tighten the collet nut onto the output shaft. As with the conventional tool tightening the collet nut fixes the bit B to the output shaft in rotation.

When the motor of tool 10 is activated it rotates not only the tool bit B but also the impeller 40. Rotation of the impeller 40 produces a negative pressure differential between the cavity and the work site, particularly at the dust collection region 46 immediately adjacent the tool bit. Thus, as the bit generates dust and debris when traveling through the drywall D, for instance, the pressure differential produced by the rotating impeller tends to keep the dust and debris centered around the bit B, and draws the dust and debris into the cavity 38 of the dust extraction system. Rotation of the impeller further allows the vanes 44 to direct the accumulated debris radially outward toward the discharge chute 34 where the debris is ejected through the discharge passageway 35.

In a further embodiment, the overall collection efficiency of the dust extraction system 30 may be improved by the addition of the baffle 50 to the opening of the base cavity 38, as shown in FIG. 3. The baffle 50 may include an annular plate 51 defining a central intake opening 52. The intake opening may be sized to coincide with the transition of the impeller vanes from the angled portion 44*a* to the main portion 44*b*, or generally coincident with the dust collection region 46. The annular plate 51 thus focuses the suction power of the impeller to the dust collection region to not only increase the volume flow of dust and debris into the extraction system but also greatly limiting the airflow outside the impeller around the location of the tool cut.

The baffle 50, shown in FIGS. 7*a*-7*b*, is configured to be removably mounted to the base 32. In one embodiment the baffle includes gripping features 55 on the outer perimeter of the annular plate 51 to facilitate manually grasping and rotating the baffle. As shown in FIG. 7*b* an engagement feature between the baffle and base includes attachment lugs 56 projecting from the underside of the baffle that define notches 56 for engaging corresponding tabs 33 on the base 32. The tabs and notches can thus be configured to allow attachment of the baffle to the base by positioning the lugs 56 adjacent the tabs 33 and rotating the baffle slightly to engage the tabs within the notches. The tabs and/or lugs may be configured for a tight resilient fit so that the baffle can be readily engaged and disengaged but remains firmly engaged during operation of the tool 10. Moreover, the tabs and lugs may be configured to form an airtight seal between the underside of the annular plate 51 of the baffle and the cylindrical wall 38*b* of the base. Other attachment features are contemplated that allow the baffle to be easily engaged and removed, such as, for instance, snap-fit, bayonet mount, threaded engagement, hook and loop fasteners, or press-fit. The baffle can be installed after the impeller 40 has been mounted to the output shaft 12, and then subsequently removed to allow removal of the impeller. The opening 52 also permits access to the collet nut 15 and/or impeller to allow loosening and retightening of the collet for replacement of the tool bit B without having to disengage the dust extraction system from the tool 10.

The components of the dust extraction system may be formed of a lightweight material, such as a polyester thermoplastic. Since the base 32 and baffle 50 are not load bearing components the wall thickness of the components may be minimized. On the other hand, since the impeller 40 and vanes 44 rotate at the speed of the tool motor and bit B the impeller should be sized to withstand the centrifugal loading associated with the rotation. Moreover, the impeller 40 should be formed to be as balanced as possible to minimize the introduction of any eccentricity or wobble as the impeller rotates with the tool bit. The dust extraction system minimizes the impact of the system on the "feel" and usability of the hand-held tool 10. Keeping the system weight to a minimum can minimize the impact on the maneuverability of the tool or the fatigue associated with supporting the tool during a lengthy cut into the workpiece or drywall D.

Figure 8:
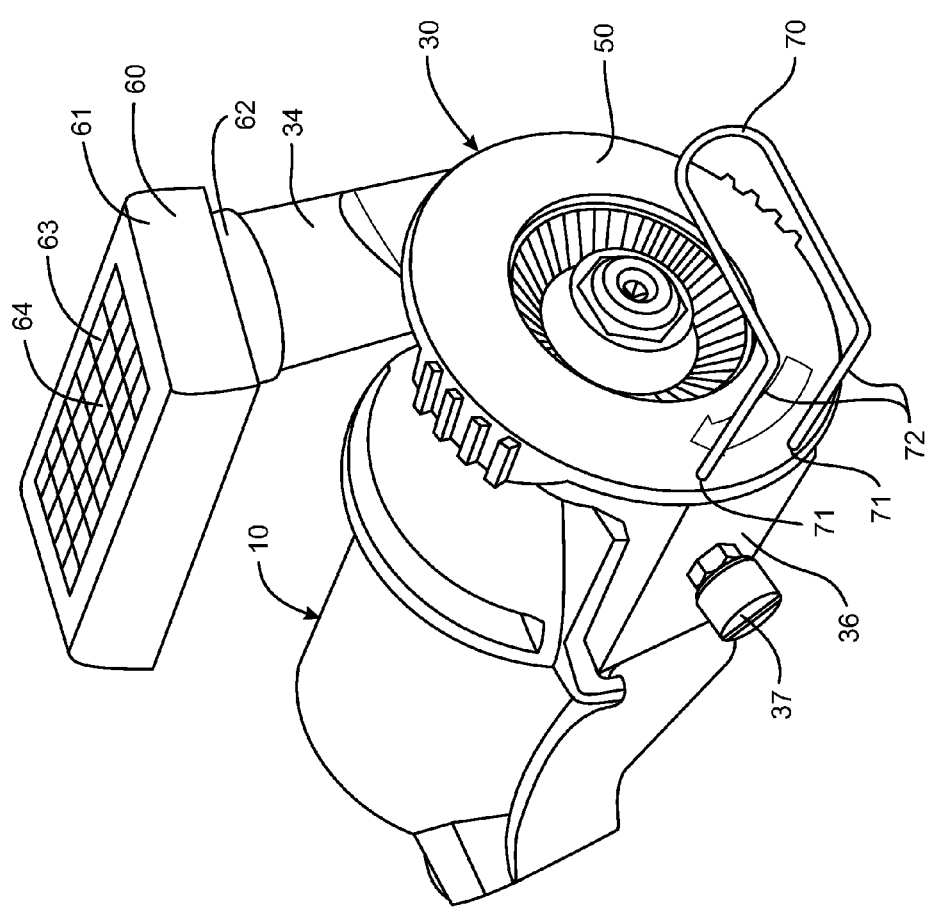
FIG. 8 is a perspective view of a dust extraction system with a debris collection receptacle mounted thereto.

As with any tool it is important to keep the view of the work site as unimpeded as possible. Thus, the dust extraction system is sized to extend only minimally outside the perimeter or profile of the working end 11*a* of the tool housing 11. The discharge chute 34 can be oriented relative to the normal gripping position for the tool housing so that the chute is outside the line of sight to the work site. In order to keep the extraction device offset from the surface of the drywall D sufficient for a clear view of the site, the depth guide 19 may be mounted to the mounting plate 36 of the system base 32. Alternatively, the mounting plate 36 and baffle 50 (when present) may incorporate bores 71, as shown in FIG. 8, for receiving a depth guide 71 constructed similar to the guide 19 (FIG. 1). The mounting plate may be configured to clamp the mounting portion 72 of the depth guide between the plate 36 and the surface 11*b* of the tool housing to permit adjustment of the depth guide.

In the illustrated embodiment, the system can be sized so that the baffle 50 does not extend outward beyond collet nut 15. Alternatively, in some instances it may be desirable to abut the baffle directly on the surface of the workpiece to capture all of the dust and debris generated by the tool bit. In this instance the surface of the baffle may be smooth or low friction to slide easily on the workpiece.

The dust and debris exiting the discharge outlet 35*b* may be collected in a dust bag (not shown) removably mounted directly to the discharge chute 34. Alternatively the discharge chute 34 may be coupled to a hose that carries the dust and debris away from the work site to be discharged onto the floor or into a trash container, for instance.

In a further embodiment, the dust and debris may be discharged to a debris collection receptacle 60 as depicted in FIG. 8. The receptacle includes a housing 61 that is sized and configured to receive a quantity of dust and debris collected by the dust extraction system 30. The receptacle includes an opening 63 that spans the majority of one face of the receptacle. The opening 63 is covered by an air permeable filter 64. The filtered opening thus ensures airflow from the discharge chute 34 through the receptacle 60. The receptacle may include a mounting neck 62 configured to be removably engaged to the conduit 34. The filter is generally impermeable to dust and debris so that the debris is collected within the receptacle. The receptacle may be configured to be emptied through the neck 62 or through the opening 63 upon removal of the filter 64.

Figure 9:
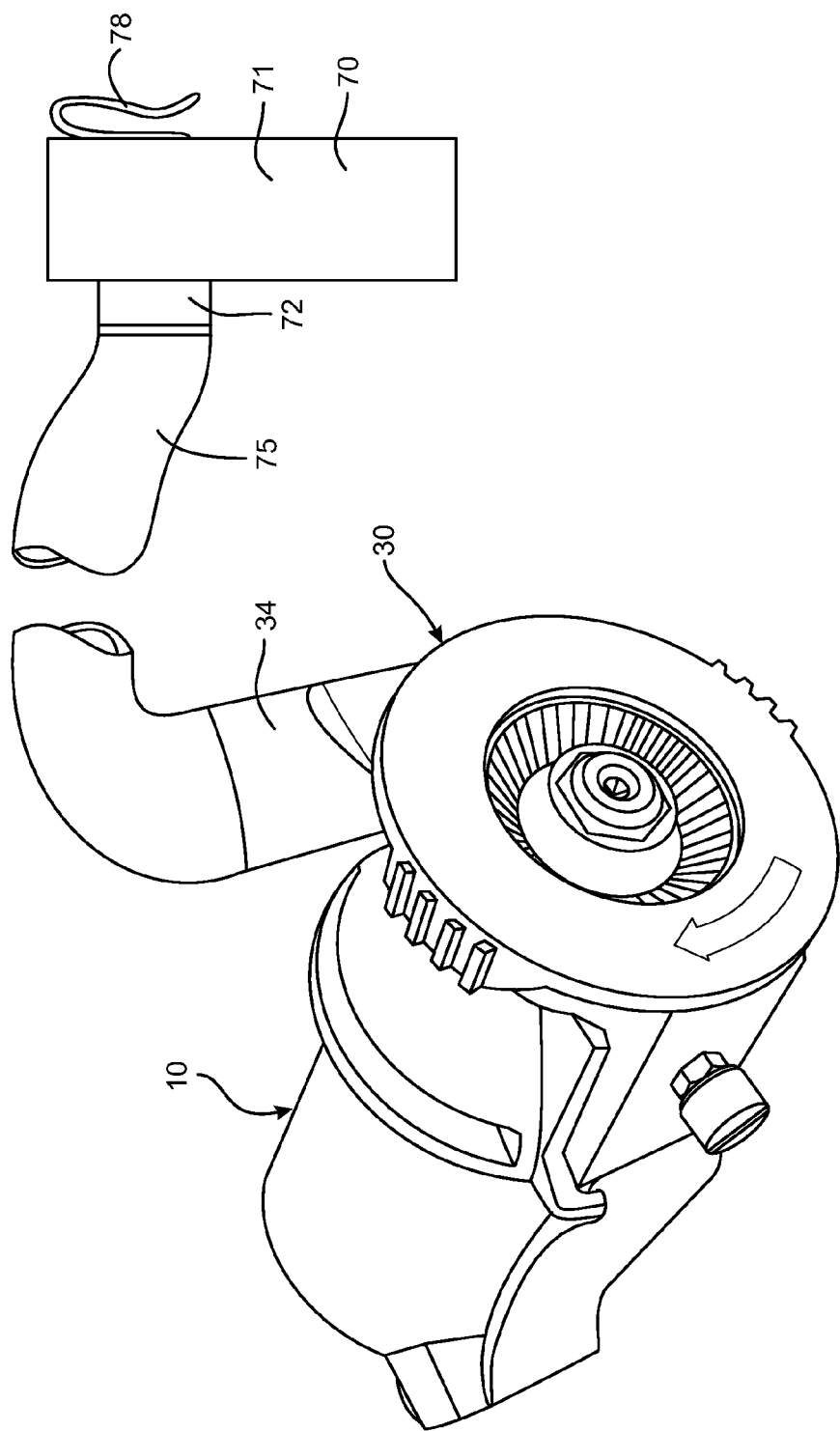
FIG. 9 is a perspective view of a dust extraction system with a belt-mounted debris collection receptacle connected thereto.

As shown in FIG. 9, a debris collection receptacle 70 may be provided that is supported remotely from the dust extraction system 30. In this embodiment, the receptacle 70 includes a flexible hose 75 that is removably connected to the discharge chute 34 of the extraction system 30. The receptacle includes a body 71 having a neck 62 to which the hose 75 is connected. The receptacle 70 may be configured like the receptacle 60 shown in FIG. 8 and described above. The neck 72 of the receptacle 70 may be configured to be mounted onto the discharge conduit 34, in the same manner as the neck 62, and alternatively to the hose 75. The connection between the hose 75 and the discharge conduit 34 and neck 72 may be of any known configuration, but may be preferably engaged without the need for a hose clamp or similar structure.

The receptacle 70 includes a clip 78 mounted to the body 71. The clip is configured to fit onto the belt or waistband of the tool user. Thus, the clip 78 may be formed of a spring steel, plastic or similar material so that it can firmly engage the belt or waistband without being dislodged while the user is operating the tool 10 and while the receptacle is being filled with dust. It is contemplated that this belt-mounted receptacle can support the receptacle 70 apart from the tool 10 so that it does not physically interfere with the user grasping or moving the tool 1. Moreover, this remotely support receptacle avoids the change in center of gravity of the tool that inherently occurs as the receptacle fills with dust and debris.

In the illustrated embodiment the baffle 50 is removably mounted to the base 32 with the impeller 40 disposed within the cavity 38. The removability of the baffle permits easy engagement of the system to the power tool and facilitates cleaning the cavity 38 of dust and debris. Alternatively the dust extraction system 30 can be provided fully assembled with the baffle 50 fixed to the base 32. In this instance the hub 42 of the impeller may be configured for press-fit engagement with the collet nut 15 while the nut is mounted on the output shaft 12 of the power tool 10. The assembled accessory may be mounted to the tool 10 by first aligning the collet nut with the bore 43 in the impeller and pressing the impeller onto the collet nut. The base 32 may be oriented as required to fasten the base to the tool. In yet another alternative, the collet nut 15 may be first engaged to the impeller prior to mounting the system on the power tool. The accessory can be positioned on the tool with the collet nut in position on the output shaft to engage the threaded portion 12*a* by rotating the impeller within the base and baffle.

The drawings and foregoing description should be considered as illustrative and not restrictive in character. It is understood that all changes, modifications and further applications of the disclosed embodiments that might occur to a person of ordinary skill in the relevant art are desired to be protected.

What is claimed is:

1. A dust extraction system for a power tool having a output shaft, a collet configured for engaging a tool bit and a collet nut engageable to the output shaft to fasten the collet to the output shaft, said system comprising:
   a base configured for mounting on the power tool, said base defining a cavity having an opening for passage of the output shaft therethrough when said base is mounted on the power tool, said base further including a discharge chute in communication with said cavity, said chute having an inlet intersecting said cavity, an outlet outside said base and a discharge passageway between said inlet and said outlet sized for passage of dust produced by operation of the tool bit on a workpiece; and
   an impeller sized and configured to be rotatably received within said cavity, said impeller including a hub and a plurality of vanes emanating from said hub, said vanes configured to draw dust from the workpiece into said cavity and to direct dust from said cavity into said discharge chute, said hub defining a bore therethrough sized and configured to removably engage the collet nut so that said impeller rotates with the collet nut and output shaft of the tool.

2. The dust extraction system of claim 1, further comprising a baffle removably mountable on said base to cover said cavity when said impeller is disposed within said cavity, said baffle defining an intake opening concentric with the output shaft and sized to receive dust and debris drawn into said cavity by operation of said impeller.

3. The dust extraction system of claim 2, wherein:
   said base includes a circumferential wall defining said cavity with said inlet of said discharge chute defined in said wall; and
   said base and said baffle are configured so that said baffle is mountable to said base to form an air-tight seal between said baffle and said circumferential wall.

4. The dust extraction system of claim 1, wherein each of said plurality of vanes emanates radially from said hub.

5. The dust extraction system of claim 4, wherein each of said plurality of vanes includes an angled portion adjacent said hub and a main portion having a generally constant height from said angled portion to the perimeter of said impeller.

6. The dust extraction system of claim 5, further comprising a baffle removably mountable on said base to cover said cavity when said impeller is disposed within said cavity, said baffle defining an intake opening concentric with the output shaft and sized to receive dust drawn into said cavity by operation of said impeller.

7. The dust extraction system of claim 1, wherein said base includes:
   a circumferential wall defining said cavity with said inlet of said discharge chute defined in said wall; and
   a mounting plate extending from said wall for engagement with the power tool.

8. The dust extraction system of claim 1, wherein said base includes:
   a circumferential wall defining said cavity; and said discharge chute includes a tubular structure projecting generally tangentially from said circumferential wall with said inlet intersecting said circumferential wall.

9. The dust extraction system of claim 1, further comprising a receptacle mountable to said discharge chute at said outlet, said receptacle sized to receive dust and debris drawn into said discharge chute by said impeller.

10. The dust extraction system of claim 9, wherein said receptacle includes a mounting neck configured for engagement with said discharge chute and an opening opposite said mounting neck, said opening covered by a filter permeable to airflow and generally impermeable to dust and debris.

11. The dust extraction system of claim 9, wherein said receptacle includes a hose connectable between said receptacle and said discharge chute for positioning said receptacle remote from the power tool.

12. The dust extraction system of claim 1, further comprising:
   a receptacle sized to receive dust and debris drawn into said discharge chute by said impeller; and
   a hose connectable between said receptacle and said discharge chute for positioning said receptacle remote from the power tool.

13. The dust extraction system of claim 12, wherein said receptacle includes a clip mounted thereto and adapted for engagement on a belt or waist band.

14. The dust extraction system of claim 1, further comprising a depth guide adjustably mounted to said base and configured to bear against the workpiece to adjust the depth of introduction of the tool bit into the workpiece.

15. A dust extraction system for a power tool having an output shaft having a threaded portion and a collet configured for engaging a tool bit, said system comprising:
   a base configured for mounting on the power tool, said base defining a cavity having an opening for passage of the output shaft therethrough when said base is mounted on the power tool, said base further including a discharge chute in communication with said cavity, said chute having an inlet intersecting said cavity, an outlet outside said base and a discharge passageway between said inlet and said outlet sized for passage of dust produced by operation of the tool bit on a workpiece;
   an impeller sized and configured to be rotatably received within said cavity, said impeller including a hub and a plurality of vanes emanating from said hub, said vanes configured to draw dust from the workpiece into said cavity and to direct dust from said cavity into said discharge chute; and
   a collet nut integrated into said hub of said impeller and configured to removably engage the threaded portion of the output shaft of the tool so that said impeller rotates with the collet nut and output shaft of the tool.

16. The dust extraction system of claim 15, wherein said hub defines a bore therethrough and said collet nut is embedded within said bore.

17. The dust extraction system of claim 15, wherein said hub defines a bore having internal threads to form the collet nut.

18. The dust extraction system of claim 15, further comprising a baffle removably mountable on said base to cover said cavity when said impeller is disposed within said cavity, said baffle defining an intake opening concentric with the output shaft and sized to receive dust and debris drawn into said cavity by operation of said impeller.

19. The dust extraction system of claim 18, wherein:
   said base includes a circumferential wall defining said cavity with said inlet of said discharge chute defined in said wall; and
   said base and said baffle are configured so that said baffle is mountable to said base to form an air-tight seal between said baffle and said circumferential wall.

20. The dust extraction system of claim 15, wherein said base includes:
   a circumferential wall defining said cavity; and
   said discharge chute includes a tubular structure projecting generally tangentially from said circumferential wall with said inlet intersecting said circumferential wall.

* * * * *